(12) United States Patent
Ohgo et al.

(10) Patent No.: US 7,918,481 B2
(45) Date of Patent: Apr. 5, 2011

(54) VEHICLE AIRBAG DEVICE AND METHOD FOR MANUFACTURING THE SAME

(75) Inventors: Masahide Ohgo, Saitama (JP); Yoshiyuki Arai, Kanagawa (JP); Nilesh Sakhare, Kanagawa (JP)

(73) Assignees: Honda Motor Co., Ltd., Tokyo (JP); Visteon Japan Ltd., Kanagawa (JP)

( * ) Notice: Subject to any disclaimer, the term of this patent is extended or adjusted under 35 U.S.C. 154(b) by 125 days.

(21) Appl. No.: 12/380,838

(22) Filed: Mar. 4, 2009

(65) Prior Publication Data
US 2009/0230660 A1    Sep. 17, 2009

(30) Foreign Application Priority Data

Mar. 13, 2008  (JP) ................. P2008-064833
Apr. 10, 2008  (JP) ................. P2008-102543
Apr. 10, 2008  (JP) ................. P2008-102611

(51) Int. Cl.
*B60R 21/205*    (2006.01)
*B60R 21/2165*    (2011.01)

(52) U.S. Cl. .................... 280/728.3; 280/732
(58) Field of Classification Search .......... 156/60; 280/728.3, 732
See application file for complete search history.

(56) References Cited

U.S. PATENT DOCUMENTS

| | | | | |
|---|---|---|---|---|
| 4,991,869 A | * | 2/1991 | Hopf et al. | 280/728.3 |
| 5,458,361 A | * | 10/1995 | Gajewski | 280/728.3 |
| 5,460,402 A | * | 10/1995 | Rhodes, Jr. | 280/728.3 |
| 5,590,903 A | * | 1/1997 | Phillion et al. | 280/728.3 |
| 5,775,727 A | * | 7/1998 | Sun et al. | 280/728.3 |
| 6,050,595 A | * | 4/2000 | Knox | 280/728.3 |
| 6,203,056 B1 | * | 3/2001 | Labrie et al. | 280/728.3 |
| 7,425,018 B2 | * | 9/2008 | Suwama et al. | 280/728.3 |
| 7,464,958 B2 | * | 12/2008 | Kong | 280/728.3 |
| 2005/0104346 A1 | | 5/2005 | Suwama et al. | |

FOREIGN PATENT DOCUMENTS

| | | |
|---|---|---|
| DE | 198 31 462 A1 | 1/2000 |
| DE | 10 2006 016 724 A1 | 10/2007 |
| EP | 1 520 754 A1 | 4/2005 |
| GB | 2 298 169 A | 8/1996 |
| JP | 11-059306 A | 3/1999 |
| JP | 2004-276680 | 10/2004 |
| JP | 2005-162033 A | 6/2005 |
| JP | 2007-320329 | 12/2007 |

\* cited by examiner

*Primary Examiner* — Toan C To
*Assistant Examiner* — Laura Freedman
(74) *Attorney, Agent, or Firm* — Carrier Blackman & Associates, P.C.; Joseph P. Carrier; William D. Blackman

(57) ABSTRACT

An airbag device in which a lid part over an opening formed in a base member opens in a suitable opening direction when the airbag is deployed. A tear seam is formed so as to extend along the axis line of a hinge shaft of the lid part in a region further to the outside than the opening. Detaching parts where a skin member on the base member detaches from the base member are provided to the outside region.

15 Claims, 16 Drawing Sheets

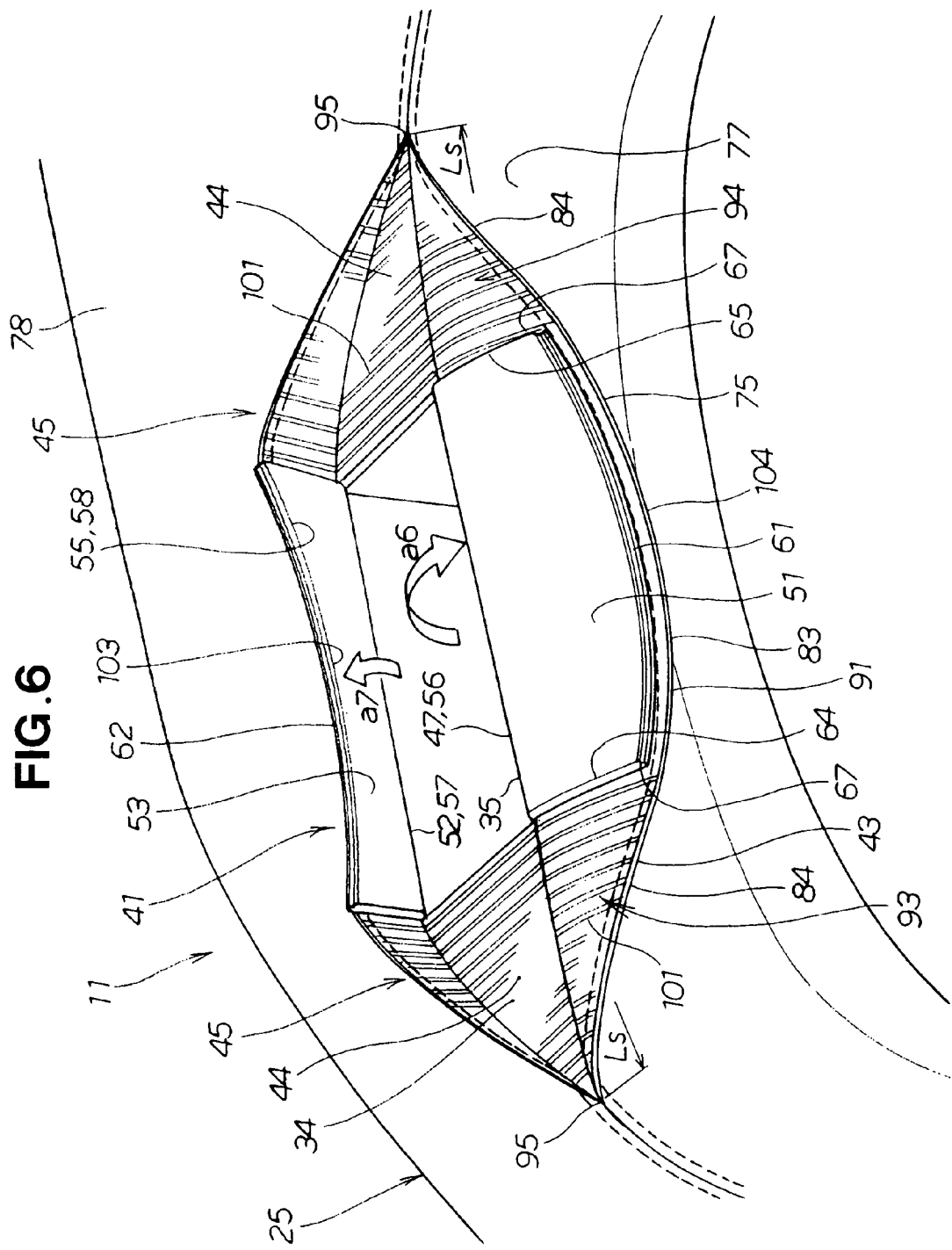

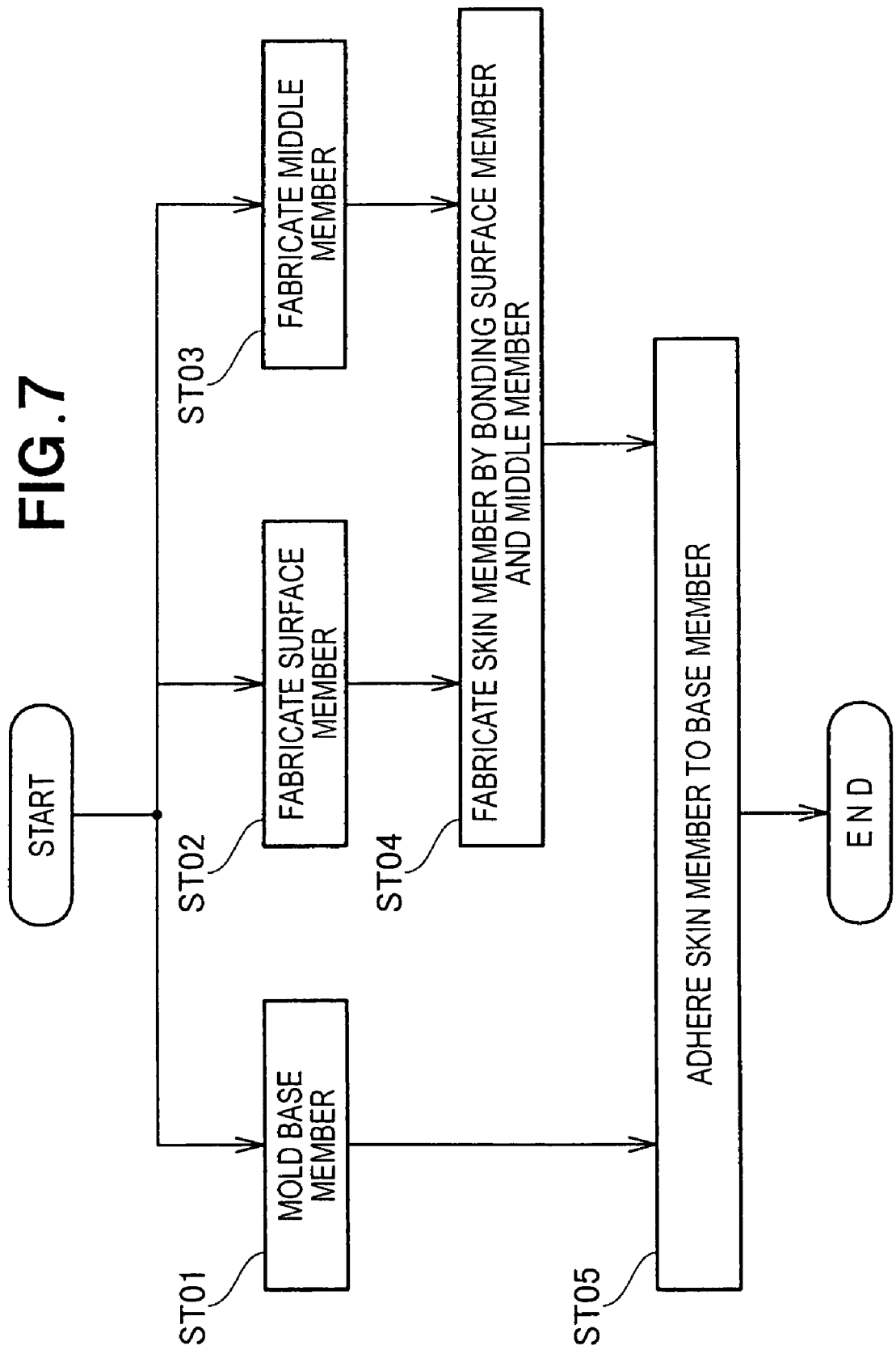

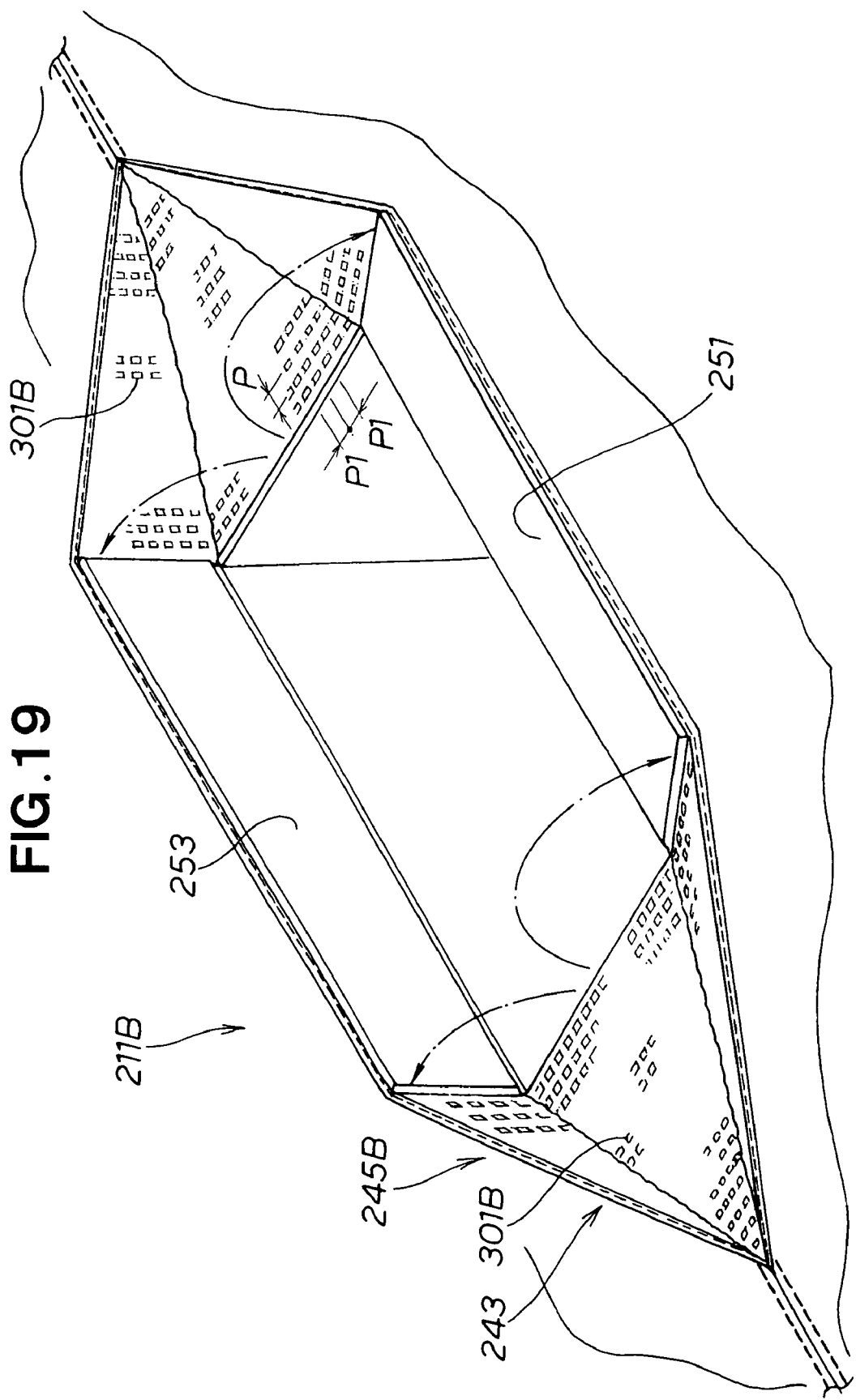

VEHICLE AIRBAG DEVICE AND METHOD FOR MANUFACTURING THE SAME

FIELD OF THE INVENTION

The present invention relates to a vehicle airbag device and to a method for manufacturing the same.

BACKGROUND OF THE INVENTION

An airbag device is disclosed in Japanese Patent Application Laid-Open Publication No. 2004-276680 (JP 2004-276680 A), which airbag device is provided with an airbag and a leather-upholstered airbag cover in which leather is used, the airbag cover being provided in such a manner as to cover the folded airbag. The leather-upholstered airbag cover is formed by applying leather to a resin cover body. A weakened part having reduced tensile strength is formed on the back surface of the leather. The weakened part is comprised of numerous incisions. The weakened part causes the leather to smoothly break when the cover body is ruptured.

However, it is a complex matter to manage leathers having different thicknesses, strengths, and other characteristics in order to enhance the ability of the airbag cover to deploy in the leather-upholstered airbag cover described above. In other words, the thickness of the leather must be 0.6 mm, and the incisions must be provided at a pitch of 4 mm in order to form the weakened part, and there is a risk of increased resistance to breakage of the weakened part when the parameters of 0.6 mm and 4 mm are exceeded.

SUMMARY OF THE INVENTION

An object of the present invention is to provide a vehicle airbag device for imparting anisotropy to the opening resistance that acts on a first flap on one side of a lid part and a second flap on the other side of the lid part, and restricting the deployment direction of the airbag.

In one aspect of the present invention, there is provided a vehicle airbag device comprising: a base member having an airbag deployment opening and at least one flap being capable of opening the opening by pivoting about a hinge shaft provided at an edge of the opening; a skin member layered on the base member; a tear seam for breaking in correspondence with the flap by deployment of the airbag, the tear seam being formed in the skin member so as to extend toward an axis line of the hinge shaft in a region further to outside than the opening; and detaching parts formed so as to correspond to the tear seam and so as to be detached from the base member by the flap at which the skin member opens in the outside region of the opening.

With this arrangement, the tear seam can impart anisotropy to the necessary load for opening the skin member, and the deployment direction of the flap and the airbag can be adjusted.

Preferably, the flap comprises two sections, a pair of hinge shafts corresponding to each of the flaps is provided opposite each other at edges of the opening, and the tear seam is formed so as to extend toward the axis line of one hinge shaft of the pair of hinge shafts and away from the other hinge shaft. Consequently, the coming apart of the flaps is accompanied by smooth breakage of the tear seam.

Desirably, one flap of the two flaps is formed as an outward-curving door in which the width from both ends of a free end of the flap to the hinge shaft is minimized; and the other flap of the two flaps is formed as an inward-curving door having a shape in which a free end of the flap matches the free end of the one flap. Consequently, the two flaps fit together in a curve, and the flaps therefore come apart smoothly.

In a preferred form, the flaps are demarcated by a weakened part that is broken by deployment of the airbag, the weakened part being formed in the base member, and the tear part is provided along the weakened part. In other words, interference between the flaps and the broken tear part can be reduced by causing the weakened part and the tear part to substantially coincide with each other.

Preferably, the other hinge shaft is provided in a lower position than the one hinge shaft, and the opening is provided at an angle. Consequently, the tear seam reduces interference between the airbag and the one flap that opens widely, and the one flap and the other flap can guide the airbag so as to deploy toward the hinge shaft of the one flap. For example, when the opening or the one flap is tilted toward the inside of the passenger compartment, the airbag deploys toward the inside of the passenger compartment.

Desirably, the region further to the outside than the opening includes an adhesion-adjusted part that is adjusted so that the adhesion between the base member and the skin member is reduced. Opening of the flaps is facilitated by the detaching of the adhesion-adjusted part from the base member. Consequently, linear opening is obtained, the flaps can be stably opened, and adverse effects on the external appearance can be reduced by causing the skin on the surface of the flaps to detach without using special processing or significantly breaking the skin member.

Preferably, the adhesion-adjusted part is adjusted so that the surface area in which an adhesive is applied between the base member and the skin member is smaller than the surface area on which an adhesive is applied in the other outside region. Consequently, the skin member in the region further to the outside than the opening easily detaches, and the resistance to detachment of the skin member from the base member can be reduced. As a result, the opening resistance during opening of the leather by the airbag deployment can be reduced, and the airbag can deploy satisfactorily.

Desirably, the adhesion-adjusted part is adjusted by forming a patterned indented part in the base member so that the surface area of contact between the base member and the skin member is smaller than the surface area of contact of the other outside region. The skin member therefore easily detaches from the base member.

In another aspect of the present invention, there is provided a method for manufacturing a vehicle airbag device, comprising the steps of: obtaining a base member having an airbag deployment opening and flaps provided at the opening in such a manner as to be capable of opening; layering on the base member a skin member having a stitch-formed tear part for breaking together with the flaps by deployment of the airbag; forming a tear seam by arranging the tear part to essentially coincide with free ends of the flaps and to extend to continue to a region outside the flaps; and bonding the skin member to the base member in a state in which an adhesion-adjusted part in which the adhesion is reduced to correspond to the tear seam is provided outside the opening.

Consequently, the operation of positioning the skin member relative to the flaps can be combined with bonding the skin member to the base member.

Preferably, the manufacturing method further comprises a step of placing together and positioning a holder formed in the skin member so as to accommodate the tear part, and a protrusion formed in the base member so as to engage with the holder. The skin member can thus be easily positioned with respect to the base member.

Desirably, the manufacturing method further comprises a step of forming a weakened part on a back surface of the base member on which the protrusion is formed, the weakened part being formed along the protrusion. The difference in the strength of the protrusion and the strength of the weakened part enables the flaps to reliably break from the weakened part, and the tear part to open at substantially the same time.

In a preferred form, the skin member comprises a surface member to which the tear part is provided, and a middle member layered with the surface member and provided with the holder in which the tear part is accommodated; and the manufacturing method further comprises a step of placing the tear part of the surface member inside the holder. The precision of the skin member positioning with respect to the flaps, and the breaking strength of the surface member can thus be set so as to depend on the middle member and the surface member, and the degree of freedom of design is enhanced.

BRIEF DESCRIPTION OF THE DRAWINGS

Certain preferred embodiments of the present invention will be described in detail below, by way of example only, with reference to the accompanying drawings, in which:

FIG. 6 is a view showing the airbag device of FIG. 2 in an opened state;

FIG. 7 is a flowchart showing a method for manufacturing the airbag device according to the first embodiment of the present invention;

FIG. 19 is a view showing a modification of the adhesion-adjusted part of the airbag device according to the second embodiment of the present invention.

DESCRIPTION OF THE PREFERRED EMBODIMENTS

Referring to FIGS. 1 through 6, discussion will now be made as to a vehicle airbag device 11 according to a first embodiment of the present invention. The airbag device 11 is used at the front passenger seat 13 of a vehicle 12.

Figure 1:
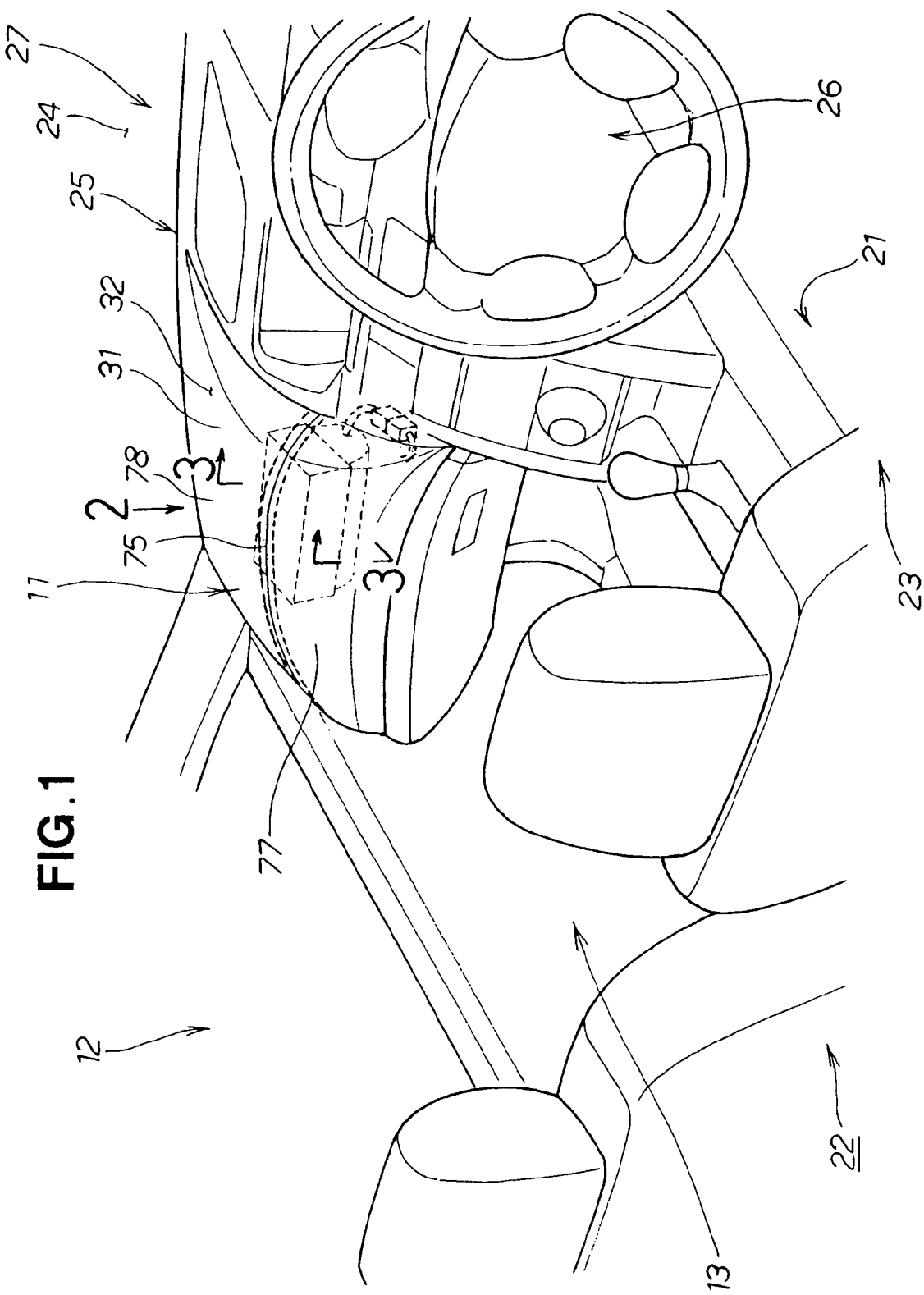
FIG. 1 is a perspective view showing a passenger compartment of a vehicle employing a vehicle airbag device according to a first embodiment of the present invention.

As shown in FIG. 1, the vehicle 12 is provided with a vehicle body 21, a passenger compartment 22, a driver seat 23, a front passenger seat 13, a windshield 24, an instrument panel 25, and an airbag unit 27 that includes the airbag device 11 for the front passenger seat 13 and an airbag device 26 for the driver seat 23.

In the instrument panel 25, a top part 31 on the side where the front passenger seat 13 is located curves outward in the shape of a gentle sphere with a large radius, and leather 32 is applied to the instrument panel 25.

Figure 2:
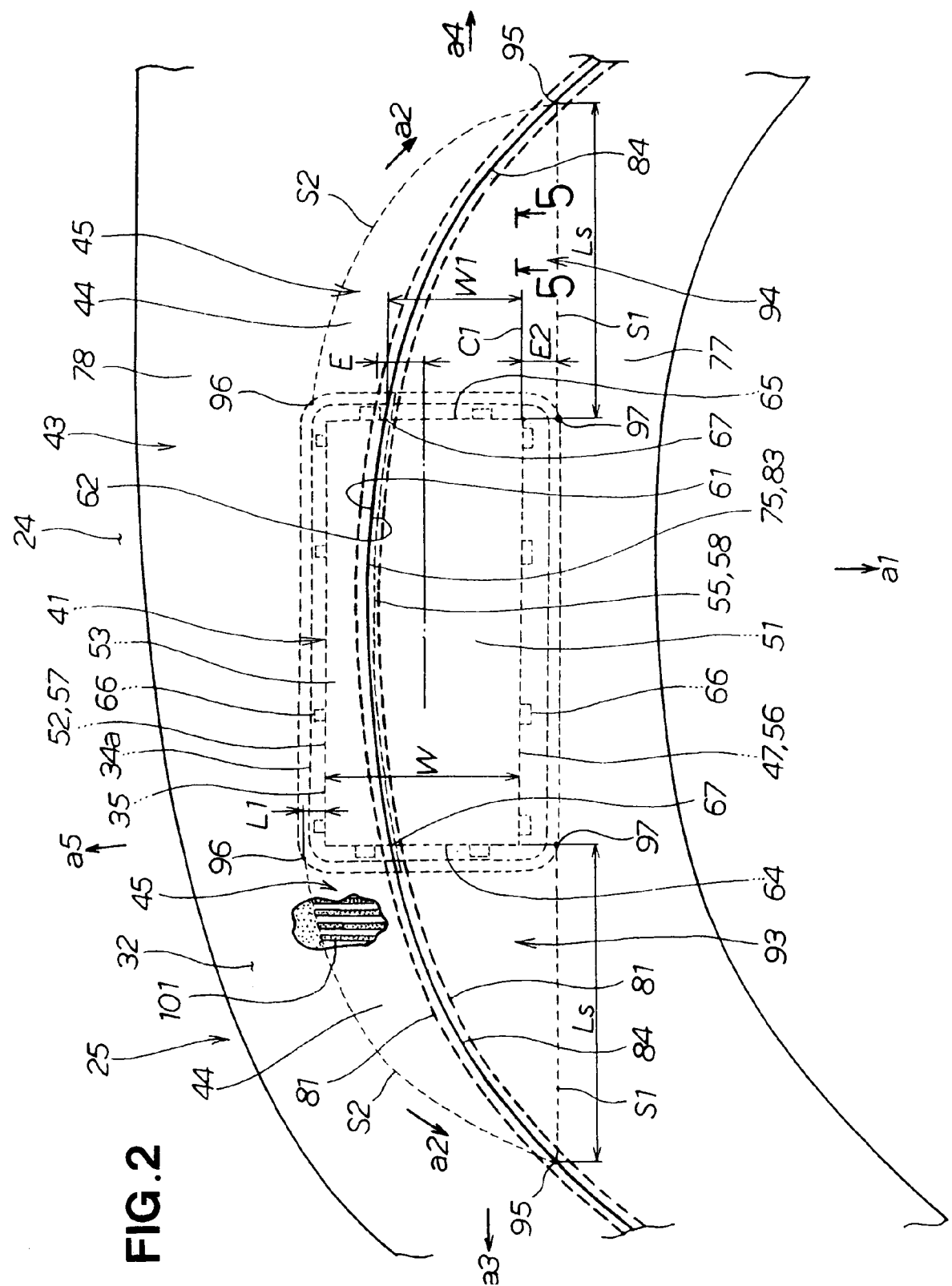
FIG. 2 is an enlarged view showing an area indicated by arrow 2 of FIG. 1.
Figure 3:
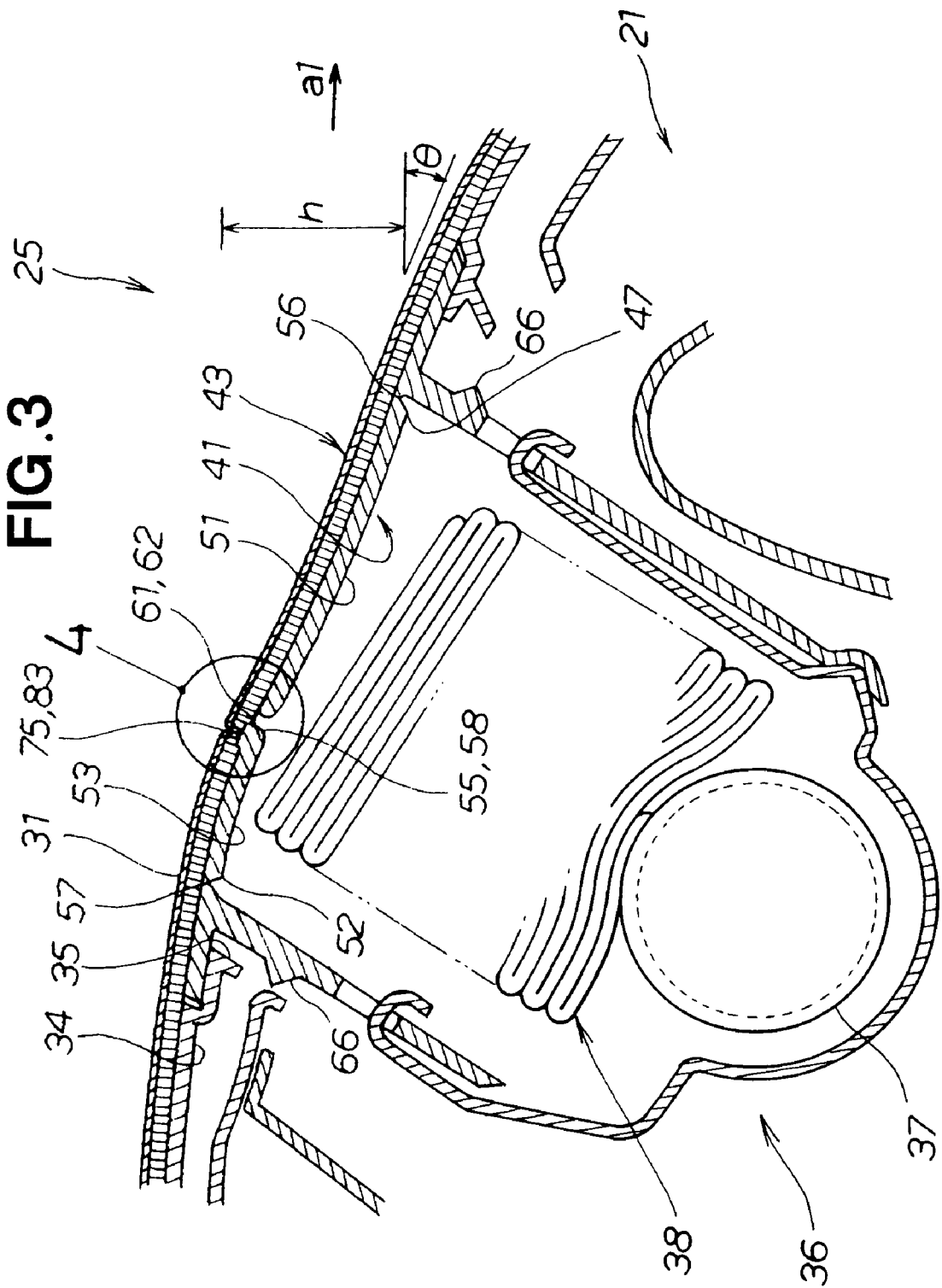
FIG. 3 is a cross-sectional view taken along line 3-3 of FIG. 1.

As shown in FIGS. 2 and 3, the airbag device 11 has an enclosure 36 that is provided in an opening 35 formed in an instrument panel main body (base member) 34 of the instrument panel 25; an airbag 38 accommodated within the enclosure 36; an inflator 37 for deploying the airbag 38; an openable lid part 41 provided at the top of the enclosure 36; a skin member 43 applied to the base member 34 of the lid part 41 and the instrument panel 25; outside regions 44 positioned further to the outside than the opening 35 of the base member 34; and adhesion-adjusted parts 45 formed in the outside regions 44.

The lid part 41 is comprised of a first flap (one flap) 51 that is formed in the enclosure 36 via a first hinge 47; a second flap (other flap) 53 that is formed in the enclosure 36 via a second hinge 52; and a tear line 55 for demarcating the first flap 51 and the second flap 53. The second hinge 52 and the second flap 53 are positioned toward the windshield 24, and the first hinge 47 and the first flap 51 are positioned toward the rear of the vehicle 12 (in the direction of the arrow a1).

The first hinge 47 has a first hinge shaft 56. The second hinge 52 has a second hinge shaft 57. The first hinge shaft 56 is positioned at a distance h lower than the second hinge shaft 57, and the opening 35 is provided at an angle (average tilt angle θ).

The term "first hinge shaft 56" refers to a part that is formed at the smallest thickness of the first hinge 47, and acts as the supporting point of the hinge. The same applies for the second hinge shaft 57.

The tear line 55 has a central tear line 58 that is a weakened part cut as a V-shaped groove in the back of the lid part 41.

The central tear line 58 is offset an average distance E from the center (W×50%) of the width W of the lid part 41, and has a curved shape in which the center of the curve is set towards the first hinge 47. The lid part 41 is divided into the first flap 51 and the second flap 53 by the breaking of the central tear line 58, and forms a first free end 61 (see also FIG. 6) of the first flap 51, and a second free end 62 (see also FIG. 6) of the second flap 53. The reference numeral 64 refers to a first side tear line, and the reference numeral 65 refers to a second side tear line.

A plurality of retaining protrusions 66 for engaging with the instrument panel 25 is formed in the enclosure 36.

The first flap 51 is formed as an outward-curving door in which the width W1 from both ends (both end corners) 67 of the first free end 61 to the first hinge shaft 56 is minimized.

The second flap 53 is formed as an inward-curving door provided with the second free end 62 that matches the first free end 61.

The skin member 43 is applied to the outward-curving door (first flap) 51 and the inward-curving door 53 to enhance the design.

Figure 4:
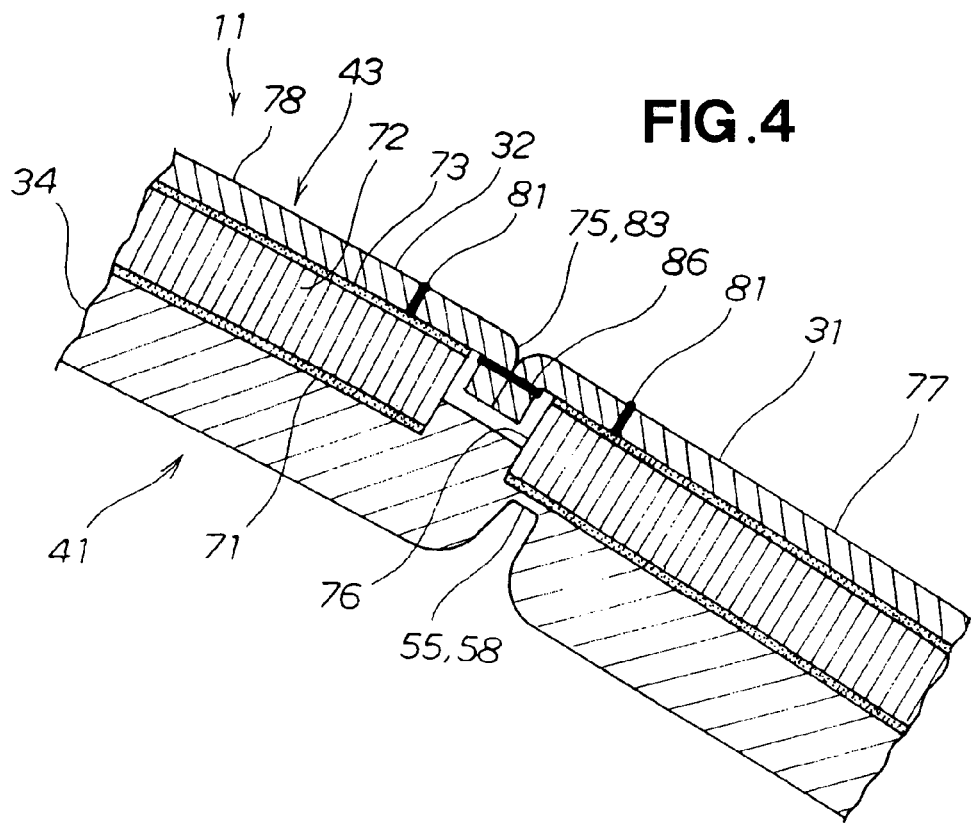
FIG. 4 is a detailed view showing a circled area 4 of FIG. 3.

In FIGS. 2, 3, and 4, the skin member 43 is comprised of a middle member (space fabric) 72 bonded on the lid part 41 by a skin member adhesive layer 71, and leather 32 bonded on the space fabric 72 by a leather adhesive layer 73.

The space fabric 72 is a cloth or a cloth-resin composite, and a stitch holder 76 is formed therein so that a stitched part 75 of the leather 32 can be accommodated. The stitched part 75 is positioned so as to be disposed at a predetermined distance from the stitch holder 76 when the stitched part 75 is accommodated, and a gap is formed between the stitched part 75 and the stitch holder 76. A misalignment with respect to the space fabric 72 and the base member 34 is thereby allowed.

The stitch holder 76 is provided in proximity to and along the central tear line 58 on the back of the lid part 41, and is provided on the surface of the lid part 41 and the surface of the base member 34.

The leather 32 is artificial or natural leather, the stitched part 75 is formed therein by stitching second leather 78 to first leather 77, stitches 81 are provided close together along the stitched part 75, and the stitched part 75 is provided along the central tear line 58 on the back of the lid part 41, and above the central tear line 58.

The stitched part 75 also acts as a tear part, and the tear part (stitched part) 75 is provided with a lid upper tear part 83 positioned at the top of the lid part 41, and a tear seam 84 that connects to the lid top tear part 83. Specifically, the stitched part 75 is provided with the tear seam 84 that is formed so as to extend toward the axis line C1 (in the direction of the arrow a2) of the first hinge shaft 56, in the outside regions 44 that extend to the lid upper tear part 83 positioned at the top of the lid part 41.

The lid upper tear part 83 is provided along the weakened part (central tear line) 58.

The stitched part 75 is formed in a curved shape, and the center of the curve is set toward the first hinge 47.

In the leather 32, a skin opening 91 (see FIG. 6) is formed by the breakage of thread 86 of the stitched part 75 that is positioned at the top of the lid part 41, and the leather 32 has a first skin detaching part 93 that is connected to one side of the skin opening 91 and that detaches to a predetermined distance Ls, and a second skin detaching part 94 that is connected to the other side of the skin opening 91 and that detaches to a predetermined distance Ls.

The "detaching of the skin member 43" refers to the two layers that include the leather 32 and the space fabric 72 detaching as a body from the base member 34.

The distances Ls shown in FIG. 2 are also the lengths of the adhesion-adjusted parts 45, and are set to approximately 1.6 times the width W of the lid part 41.

The adhesion-adjusted parts 45 are formed to the outside (in the direction of the arrow a3) of one end (the first side tear line 64) of the lid part 41, and to the outside (in the direction of the arrow a4) of the other end (the second side tear line 65) of the lid part 41.

The adhesion-adjusted parts 45 are provided within triangular regions formed by line segments that pass through first endpoints 95, second endpoints 96, and third endpoints 97 in plan view, and weak adhesive layers 101 are formed in the triangular regions.

The first endpoints 95 are endpoints intersected by lines S1 that are positioned at a distance E2 to the outside of the opening 35 (in the direction of the arrow a1) from the axis line C1 of the first hinge shaft 56.

The second endpoints 96 are endpoints that are positioned at a distance L1 to the outside (in the direction of the arrow a5) from the second hinge 52.

The third endpoints 97 are endpoints that are positioned at a distance E2 to the outside of the opening 35 (in the direction of the arrow a1) from the axis line C1 of the first hinge shaft 56.

The same adhesive as in the skin member adhesive layer 71 is used in these triangular regions, but the weak adhesive layers 101 are formed with the adhesive applied in a different manner.

Figure 5:
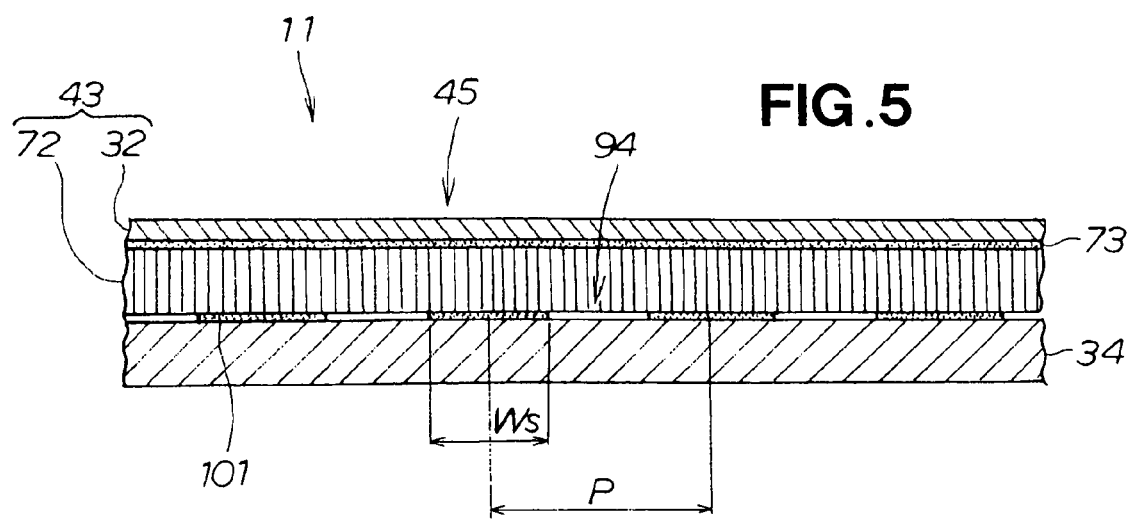
FIG. 5 is a cross-sectional view taken along line 5-5 of FIG. 2.

As shown in FIGS. 2 and 5, the weak adhesive layers 101 are formed by arranging an adhesive in substantially parallel columns at a pitch P and width Ws on both ends (first side tear line 64) of the lid part 41, and since the surface area in which the adhesive is applied is reduced in comparison to that of the other adhesion region (skin member adhesive layer 71), the adhesion force per unit of surface area is small in comparison to the skin member adhesive layer 71. The length of the columns is within the aforementioned triangular regions, and the ends of the columns reach S1 and S2.

The "other adhesion region" is the portion bonded by the skin member adhesive layer 71 outside the triangular regions.

The pitch P and width Ws are approximations, and are within desired ranges (tolerances).

The operation of the airbag device of the first embodiment will next be described.

In the airbag device 11 as shown in FIGS. 1 through 6, when an impact occurs at the front surface of the vehicle, the inflator 37 is activated based on front-surface impact information.

When the airbag 38 begins to be deployed by the inflator 37, the stress on the center 103 of the central tear line 58 is increased by the deployment force of the airbag 38, and the center 103 therefore begins to break at a starting point.

Since the stitched part 75 also breaks at the same time, the skin opening 91 begins to open. At this time, the stress increases at the center 104 of the stitched part 75, i.e., at the center 104 of the lid upper tear part 83, and breakage begins with the center 104 as the starting point.

In the airbag device 11, breakage can thus be reliably initiated from the center 103 of the central tear line 58 and the center 104 of the stitched part 75, and breakage begins and progresses smoothly.

When tearing has progressed to both ends (both end corners 67) of the central tear line 58, the first side tear line 64 and the second side tear line 65 begin to break.

At this time, since the skin member 43 begins to detach from the base member 34 provided with the adhesion-adjusted parts 45, and the threads of the stitched part 75 break in the first skin detaching part 93 and second skin detaching part 94, the first skin detaching part 93 and the second skin detaching part 94 begin to open as indicated by the arrows a6 and a7. In other words, detachment of the skin member 43 occurs in the adhesion-adjusted parts 45.

In the adhesion-adjusted parts 45, since the adhesive is arranged in lines having a predetermined pitch P and width Ws, the adhesion force is small, and the resistance to detachment/opening of the skin member 43 can be reduced. Consequently, the resistance when the first flap 51 opens is small, and the deployment direction of the airbag 38 can be restricted.

Then, while the first side tear line 64 and the second side tear line 65 continue to be broken by the deploying force of the airbag 38, the first flap 51 and the inward-curving door second flap 53 pivot as indicated by the arrows a6 and a7 about the supporting axes of the first hinge 47 and the second hinge 52, respectively.

At this time, detachment of the skin member 43 continues in the adhesion-adjusted parts 45 as described above, but because the adhesive in the adhesion-adjusted parts 45 is arranged in columns at a predetermined pitch P and width Ws, the adhesion is low, and the resistance to detachment/opening of the skin member 43 can be reduced. Consequently, the resistance when the first flap 51 opens is small, and the deployment direction of the airbag (bag) 38 can be restricted.

In other words, the first flap 51 can open wide, and the deployment direction of the airbag (bag) 38 can be restricted to the opening direction (direction of the arrow a6) of the first flap 51.

The method for manufacturing the airbag device of the first embodiment will next be described based on FIGS. 7 through 10.

FIG. 7 is a flow diagram showing an overview of the method for manufacturing the airbag device.

Step (hereinafter abbreviated as "ST") 01: The base member 34 is resin-molded.

ST02: The surface member (leather) 32 is fabricated.

ST03: The middle member 72 is fabricated.

ST04: The skin member 43 is fabricated by bonding the surface member (leather) 32 and the middle member 72.

ST05: The skin member 43 is bonded to the base member 34.

ST01 through ST05 will next be specifically described.

Figure 8A:
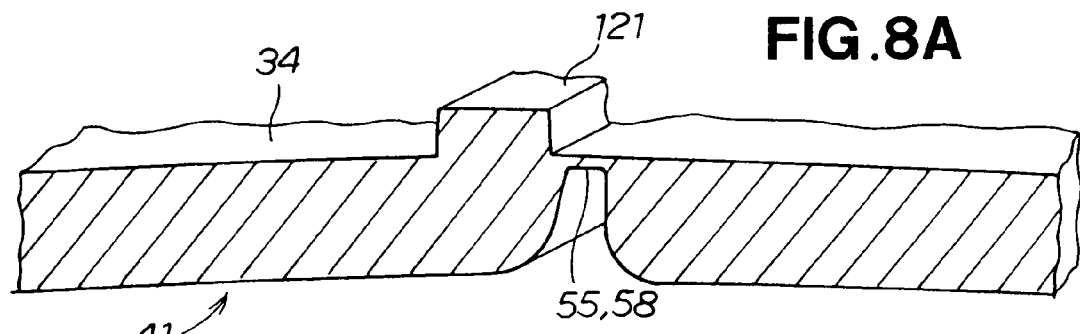
FIGS. 8A and 8B are views showing how the base member and the surface member are obtained in the process flow of FIG. 7.
Figure 8B:
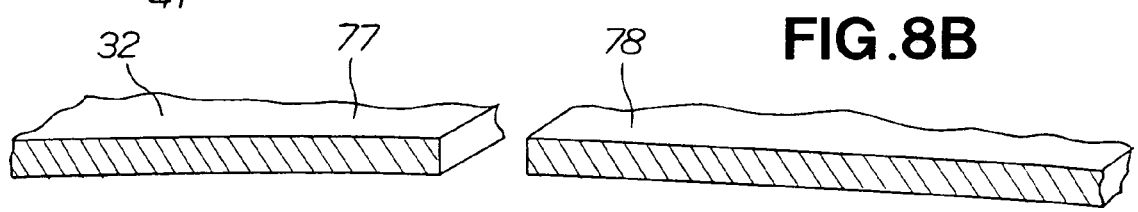

FIGS. 8A and 8B show the base member and surface member obtained by the airbag device manufacturing method. The description will also refer to FIGS. 1 through 6.

The base member 34 is first resin-molded, as shown in FIG. 8A. The airbag deployment opening 35, the lid part 41, the tear line 55, and a protrusion 121 are formed in the base member 34.

The leather 32 as the surface member is prepared as shown in FIG. 8B. The leather is cut into the predetermined shapes of the first leather 77 and the second leather 78.

Figure 9A:
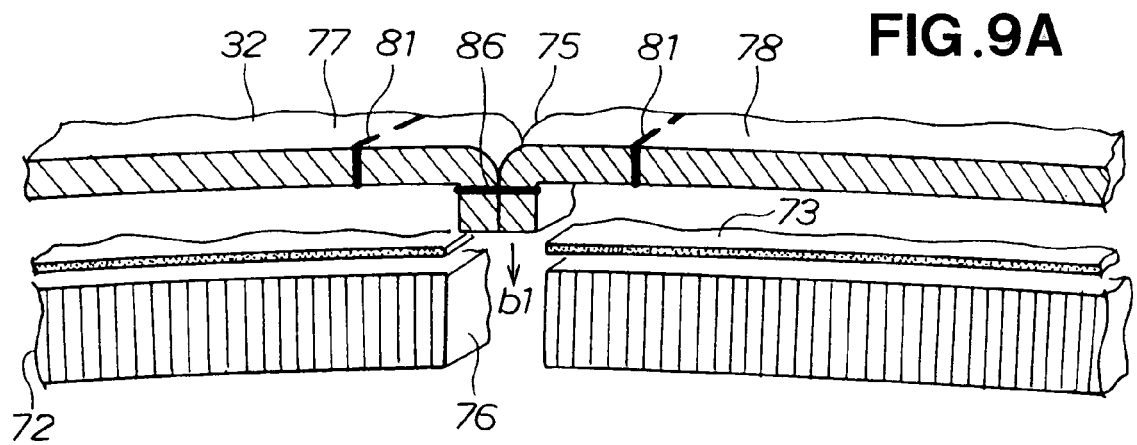
FIGS. 9A and 9B are views showing how the skin member is fabricated in the process flow of FIG. 7.
Figure 9B:
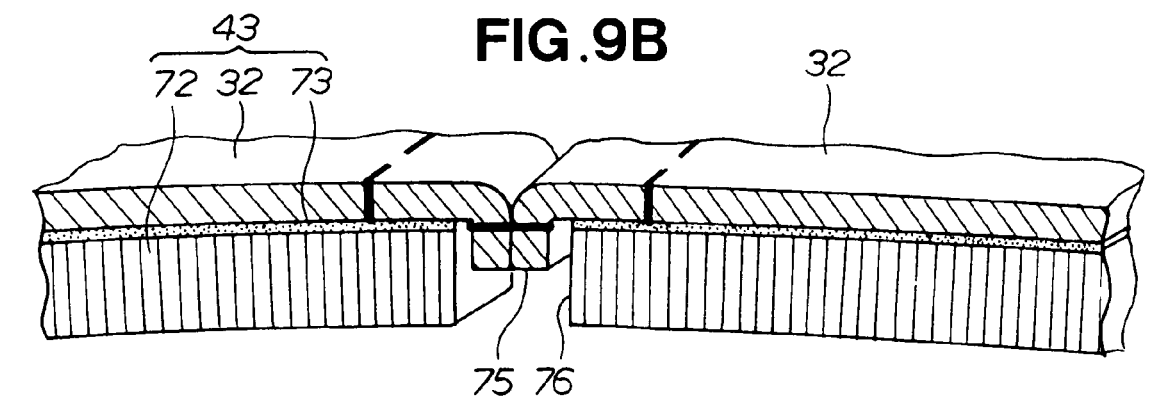

FIGS. 9A and 9B show the surface member fabrication step (which includes a tear part positioning step).

The leather 32 is stitched as shown in FIG. 9A. The tear part 75 is formed by stitching the first leather 77 and the second leather 78 with thread 86. Stitches 81 are also provided.

The middle member 72 is then fabricated. The middle member 72 comprised of a fabric material is cut along the base member 34, and the stitch holder 76 is formed.

The skin member fabrication step is started. The tear part positioning step is performed first. In order to fabricate the skin member 43, the leather adhesive layer 73 is formed by applying adhesive to the middle member 72, and the leather 32 is placed on the leather adhesive layer 73. At this time, the tear part 75 that is the stitched part is fitted into the stitch holder 76 of the middle member 72 as indicated by the arrow b1.

As shown in FIG. 9B, when the tear part 75 is fitted into the stitch holder 76, the tear part 75 is positioned in the middle member 72.

In the tear part positioning step, it is sufficient merely to fit the tear part 75 into the stitch holder 76 as indicated by the arrow b1, and positioning of the leather 32 when the skin member 43 is formed is thus facilitated.

In other words, the positioning of the tear part 75 in a subsequent step (a downstream step) so as to correspond to the central tear line 58 is facilitated, and the precision of this positioning is easily increased.

Then, when the leather 32 placed on the leather adhesive layer 73 has been pressed for a predetermined time, the skin member 43 is completed, and the skin member fabrication step is completed.

Figure 10A:
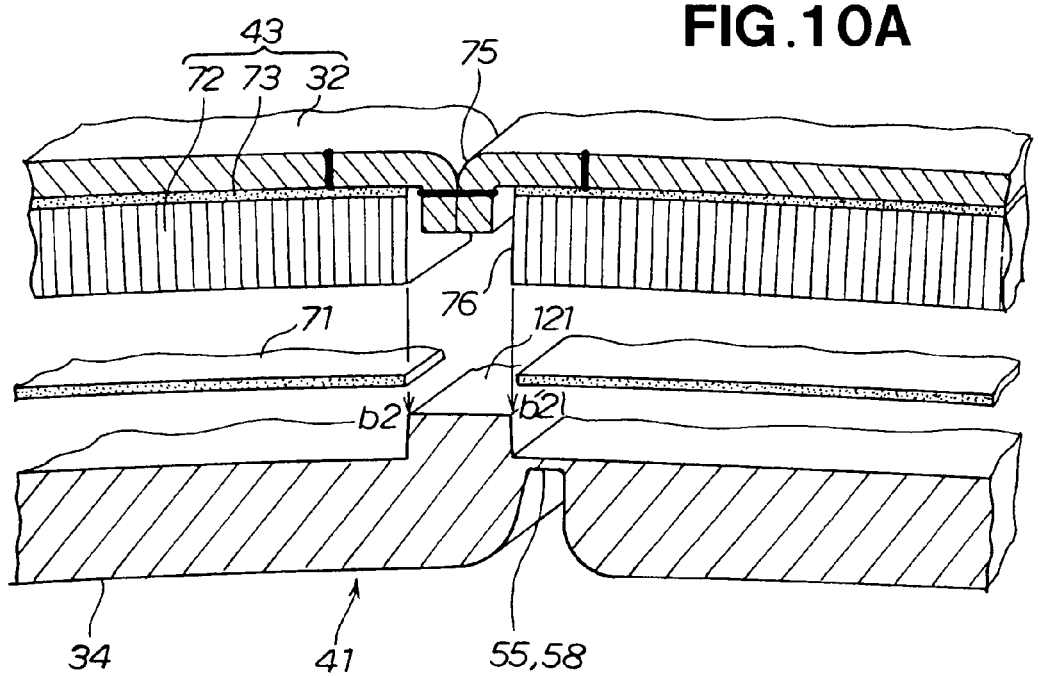
FIGS. 10A and 10B are views showing how the skin member is bonded to the base member in the process flow of FIG. 7.
Figure 10B:
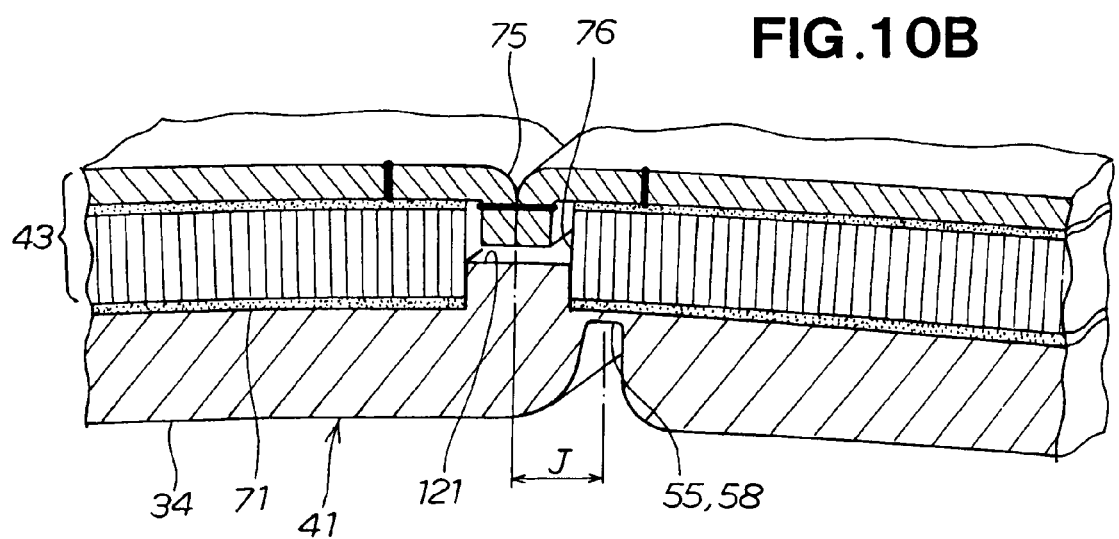

FIGS. 10A and 10B show the skin member adhesion step.

The skin member adhesive layer 71 is first formed by applying adhesive to the base member 34, and the skin member 43 is placed on the skin member adhesive layer 71 as shown in FIG. 10A. At this time, the stitch holder 76 provided integrally with the skin member 43 is fitted on the protrusion 121 of the base member 34 as indicated by the arrow b2. As shown in FIG. 10B, the skin member 43 is positioned on the base member 34 when the components are fit together. Specifically, fluctuation can be reduced in the distance J from the central tear line 58 that is the weakened part to the tear part 75. In other words, the tear part 75 is easily provided and affixed along the central tear line 58 while the distance J is maintained.

In the skin member adhesion step, the stitch holder 76 need only be fitted over the protrusion 121, as indicated by arrow b2, and the tear part 75 of the skin member 43 is easily positioned with respect to the lid part 41 (central tear line 58).

Figure 11:
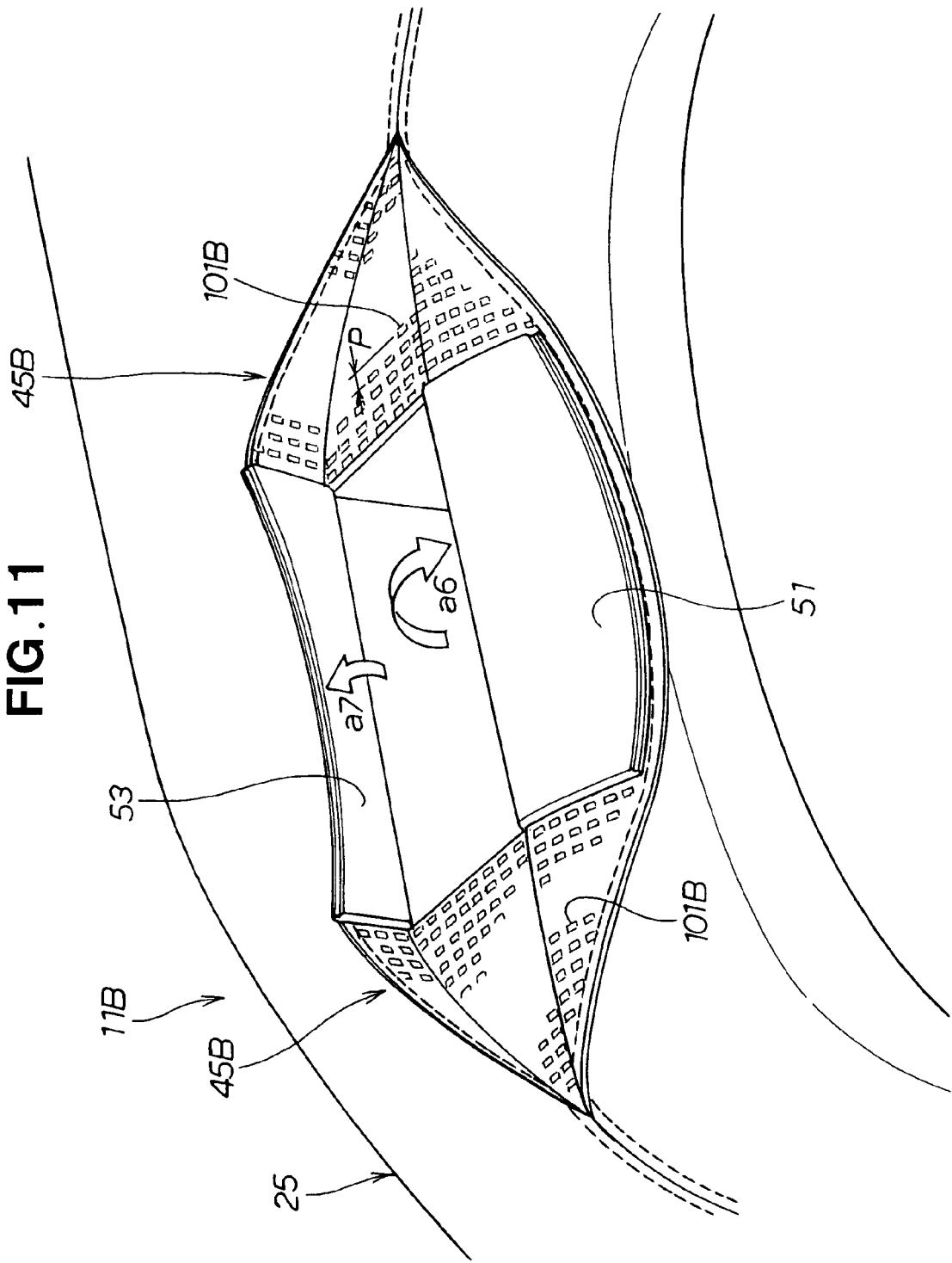
FIG. 11 is a schematic view showing a first modification of the airbag device according to the first embodiment of the present invention.

FIG. 11 shows the airbag device 11B according to a first modification. The same reference numerals are used to refer to members that are the same as those of the first embodiment.

The airbag device 11B of the first modification differs with respect to the configuration of the adhesion-adjusted parts 45 described in the first embodiment.

Weak adhesive layers 101B are formed in the triangular regions in the adhesion-adjusted parts 45B of the first modification. An adhesive is arranged in numerous points at a pitch P in the weak adhesive layers 101B.

Even though the weak adhesive layers 101B are arranged in points, the same operation and effects are obtained as in the airbag device 11 of the first embodiment. In other words, the deployment direction of the airbag 38 shown in FIG. 3 can be restricted.

Figure 12A:
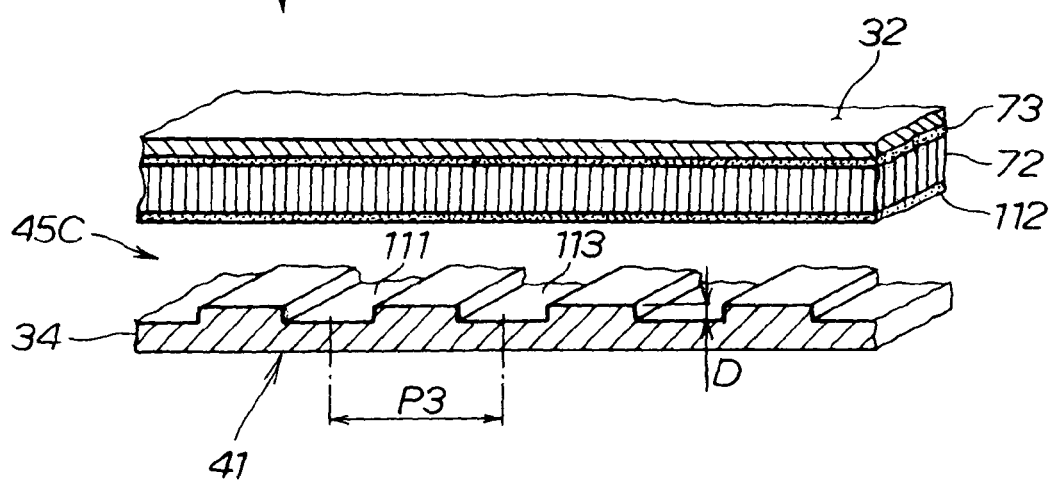
FIGS. 12A and 12B are schematic views of a second modification of the airbag device according to the first embodiment of the present invention, showing the base member with a patterned irregular part formed on its surface.
Figure 12B:
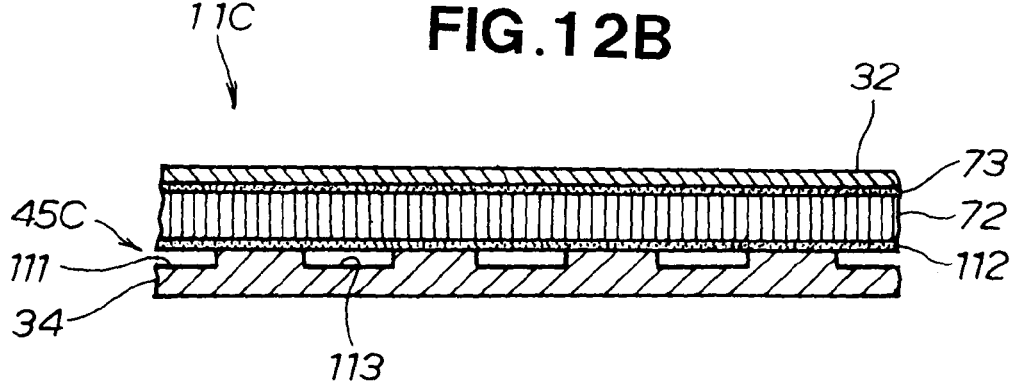

FIGS. 12A and 12B show the airbag device 11C of a second modification that is provided with adhesion-adjusted parts 45C that differ from the adhesion-adjusted parts 45 of the first embodiment.

The adhesion-adjusted parts 45C of the second modification are comprised of patterned irregular parts 111 that are formed on the surface of the base member 34 in the triangular regions. An adhesive layer 112 is formed in the same manner as the skin member adhesive layer 71 (see FIG. 4) of the first embodiment.

The patterned irregular parts 111 are grooves 113 formed in straight lines substantially parallel to each other at a pitch P3 and depth D at both ends of the lid part 41, the lengths thereof are within the triangular regions, the same as in the first embodiment, and the ends thereof reach the line segments S1 and S2 shown in FIG. 2.

The airbag device 11C of the second modification has the same operation and effects as the airbag device 11 of the first embodiment. In other words, the deployment direction of the airbag 38 can be restricted.

The same adhesive layer 112 as that of the skin member adhesive layer 71 of the first embodiment is thus formed on the entire surface of the middle member 72 in the second modification, the adhesive layer 112 can be affixed over the patterned irregular parts 111, and the adhesion operation is easier than in the first embodiment.

FIGS. 13 through 18 show the airbag device 211 according to a second embodiment.

Figure 13:
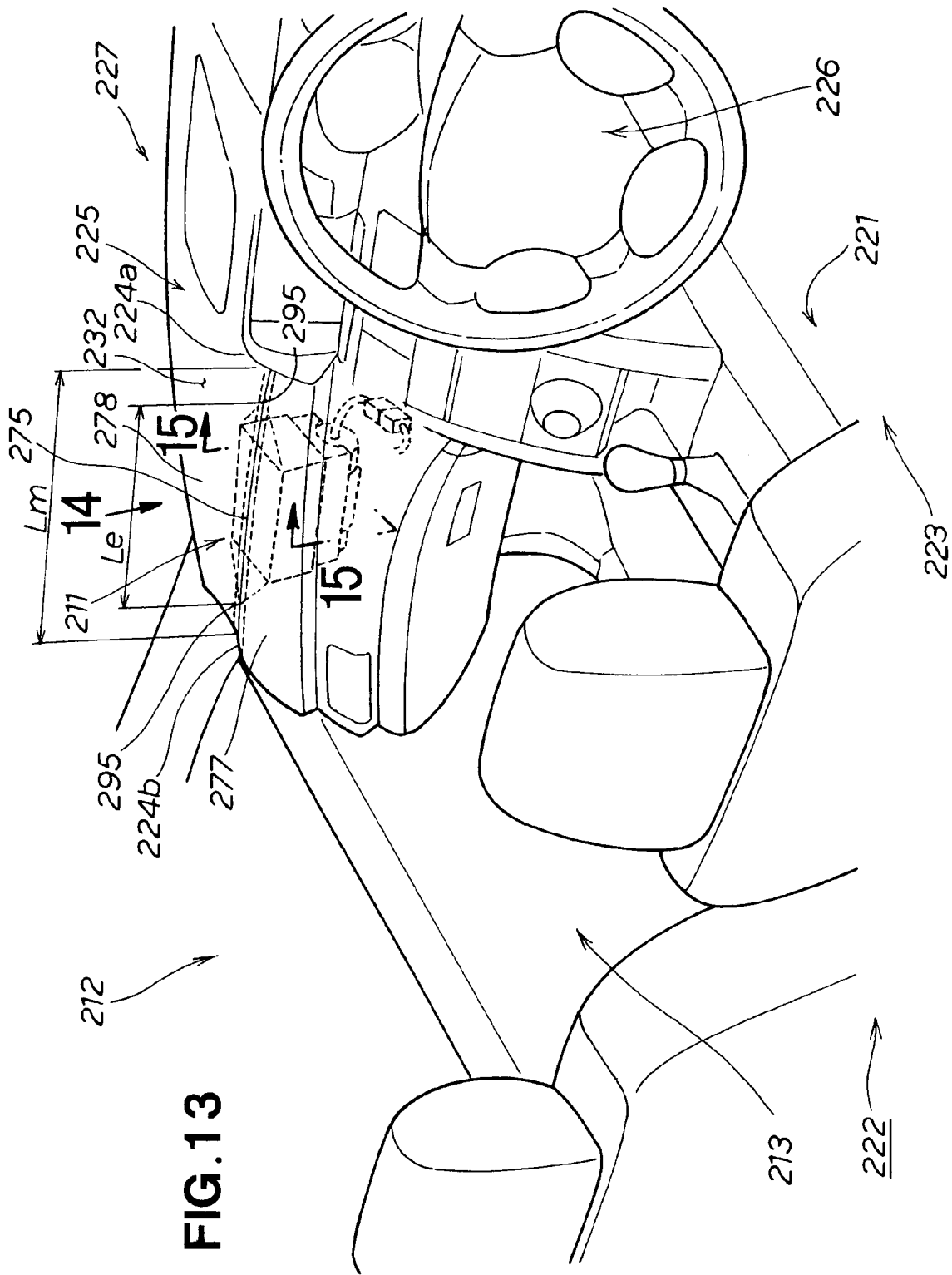
FIG. 13 is a perspective view showing a passenger compartment of a vehicle employing an airbag device according to a second embodiment of the present invention.

As shown in FIG. 13, the vehicle 212 is provided with a vehicle body 221, a passenger compartment 222, a driver seat 223, a front passenger seat 213, a windshield 224, an instrument panel 225, and an airbag unit 227 that includes the airbag device 211 for the front passenger seat 213 and an airbag device 226 for the driver seat 223.

Leather 232 is applied to the instrument panel 225.

Figure 14:
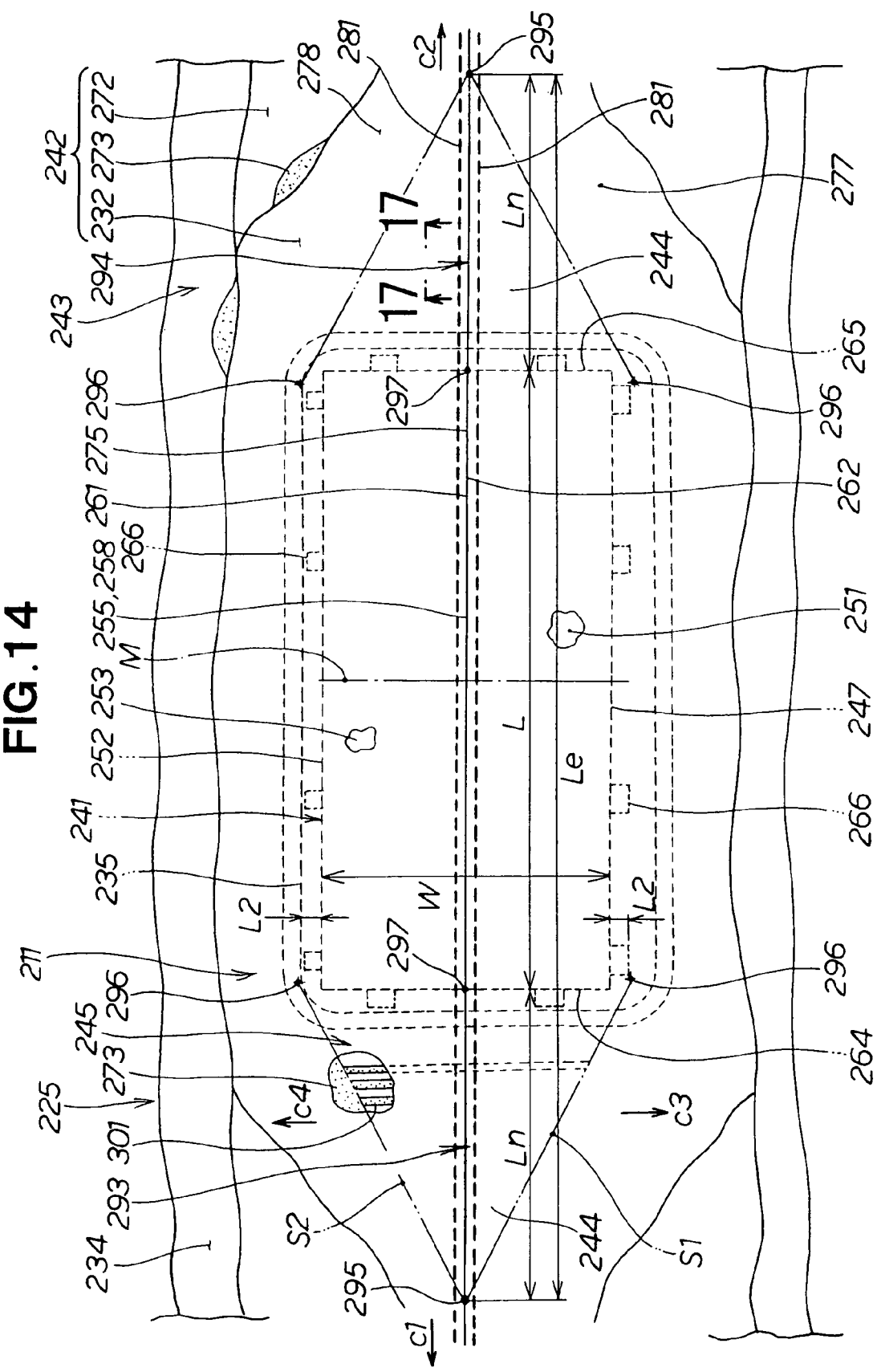
FIG. 14 is a view showing an area indicated by arrow 14 in FIG. 13.
Figure 15:
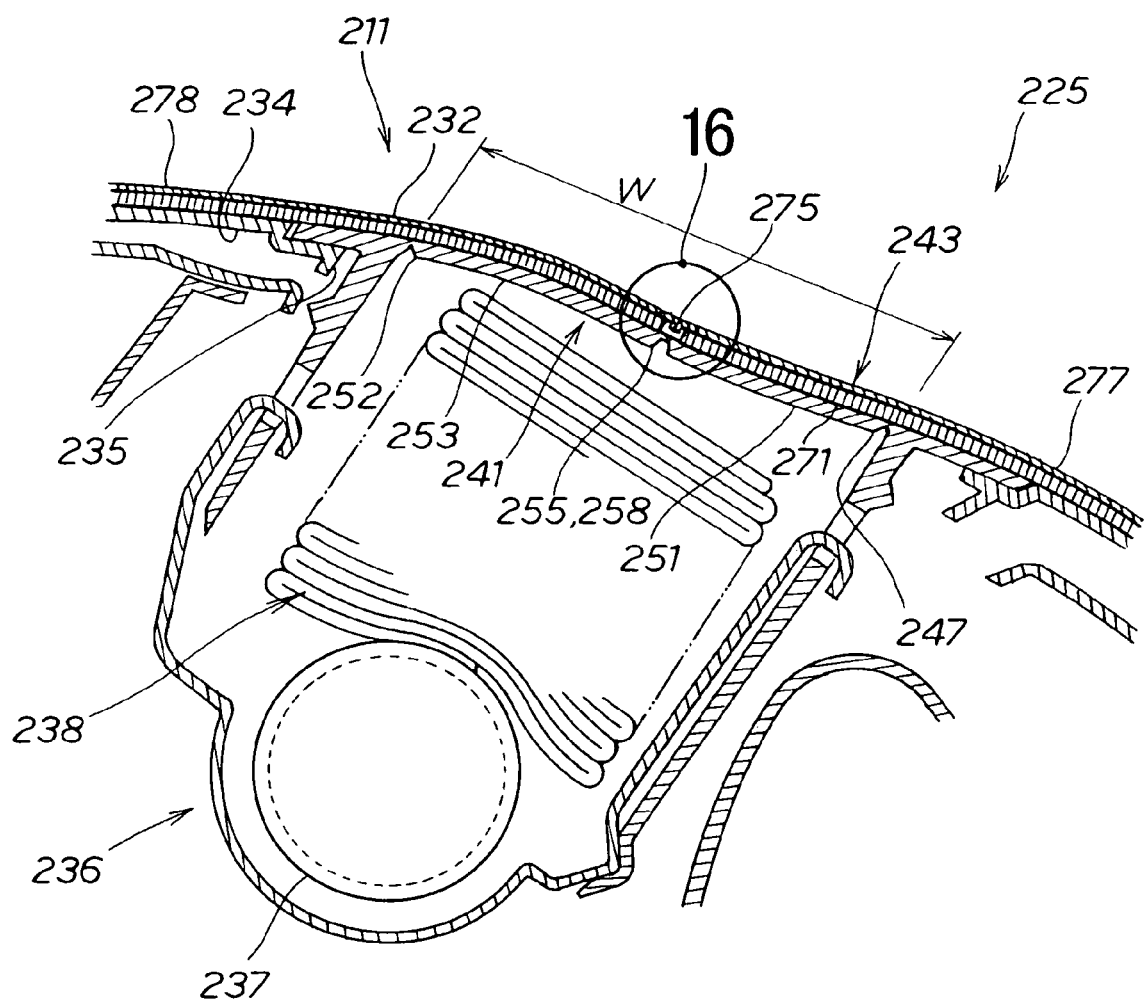
FIG. 15 is a cross-sectional view taken along line 15-15 of FIG. 13.

As shown in FIGS. 14 and 15, the airbag device 211 is provided with an enclosure 236 that is provided in an opening 235 formed in an instrument panel main body (base member) 234 of the instrument panel 225; an airbag 238 accommodated within the enclosure 236; an inflator 237 for deploying the airbag 238; an openable lid part 241 provided at the top of the enclosure 236; a skin member 243 applied to the base member 234 of the lid part 241 and the instrument panel 225; and adhesion-adjusted parts 245 formed in outside regions 244 positioned further to the outside than the opening 235 of the base member 234

The lid part 241 is comprised of a first flap (one flap) 251 that is formed in the enclosure 236 via a first hinge 247; a second flap (other flap) 253 that is formed in the enclosure 236 via a second hinge 252; and a tear line 255 that is cut in a V shape in the back surface of the first flap 251 and the second flap 253.

The tear line 255 is formed in the center (W×50%) of the width W of the lid part 241, and is comprised of a central tear line 258 in a straight line that divides the first flap 251 and the second flap 253; a first side tear line 264 formed at one end in the longitudinal direction of the lid part 241, the lid part 241 having a total length L; and a second side tear line 265 formed at the other end. A first free end 261 (see FIG. 18) of the first flap 251, and a second free end 262 (see FIG. 18) of the second flap 253 are formed by the breaking of the central tear line 258.

Retaining protrusions 266 for engaging with the instrument panel 225 is formed in the enclosure 236.

Figure 16:
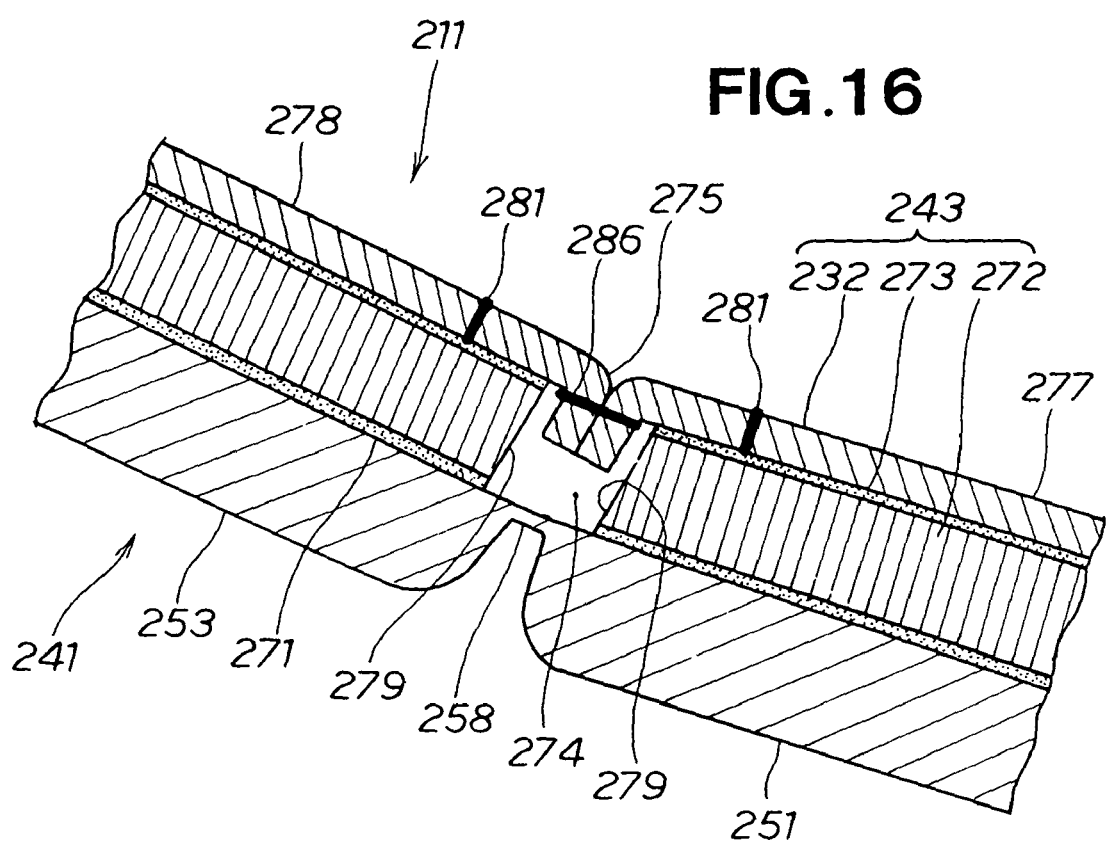
FIG. 16 is an enlarged sectional view showing an area indicated by reference numeral 16 in FIG. 15.

In FIGS. 14, 15, and 16, the skin member 243 is comprised of a middle member (space fabric) 272 bonded on the lid part 241 by a skin member adhesive layer 271, and leather 232 bonded on the space fabric 272 by a leather adhesive layer 273.

The space fabric 272 is a cloth or a cloth-resin composite, for example. A stitch-accommodating space 274 is formed so as to substantially coincide with the central tear line 258 in order to accommodate a stitched part (tear part) 275 of the leather 232.

The leather 232 is artificial or natural leather, and the stitched part 275 is formed therein by stitching first leather 277 and second leather 278. Stitches 281 are provided close to the tear part 275 along both sides of the tear part 275. The tear part 275 is positioned above the central tear line 258 so as to correspond to the position of the central tear line 258 formed on the back surface of the lid part 241.

A skin opening 291 (see FIG. 18) is formed by the breakage of thread 286 of the stitched part (tear part) 275. As shown in FIG. 14, a first skin detaching part 293 of the tear part 275 extends in the skin opening 291 a predetermined distance Ln from one endpoint (third endpoint) 297 of the lid part 241, and a second skin detaching part 294 of the tear part 275 extends in the skin opening 291 a predetermined distance Ln from the other endpoint (third endpoint) of the lid part 241.

The distances Ln shown in FIG. 14 are also the lengths of the adhesion-adjusted parts 245, and are set to approximately 1.2 times the width W of the lid part 241.

The adhesion-adjusted parts 245 are formed to the outside (in the direction of the arrow c1) of one end of the lid part 241, and to the outside (in the direction of the arrow c2) of the other end of the lid part 241, and are substantially symmetrical about the symmetry line M.

As shown in FIG. 14, the adhesion-adjusted parts 245 are provided within triangular regions formed by line segments that pass through first endpoints 295, second endpoints 296, and third endpoints 297 in plan view, and weak adhesive layers 301 are formed in the triangular regions.

The first endpoints 295 are points at a distance Ln to the outside (in the direction of the arrow c1) from the first side tear line 264 of the lid part 241.

The second endpoints 296 are a point at a distance L2 to the outside (in the direction of the arrow c3) from the first hinge 247, and a point at a distance L2 to the outside (in the direction of the arrow c4) from the second hinge 252.

The third endpoints 297 are positioned at both corners of the first free end 261 or the second free end 262.

The same adhesive as in the skin member adhesive layer 271 (FIG. 16) is used in these triangular regions, but the weak adhesive layers 301 are formed with the adhesive applied in a different manner.

The length Le of the skin opening 291 is Le=L+2Ln. Specifically, Le is the length obtained by adding the total length L of the lid part 241, the length Ln of the first skin detaching part 293, and the length Ln of the second skin detaching part 294. In other words, Le is the length between the first endpoints 295, 295 of the adhesion-adjusted parts 245.

The length Lm (FIG. 1) of the stitched part 275 is greater than the length Le of the skin opening 291 (Lm>Le), and is the length from the vehicle-width center 224a of the instrument panel 225 to the left end 224b.

Figure 17:
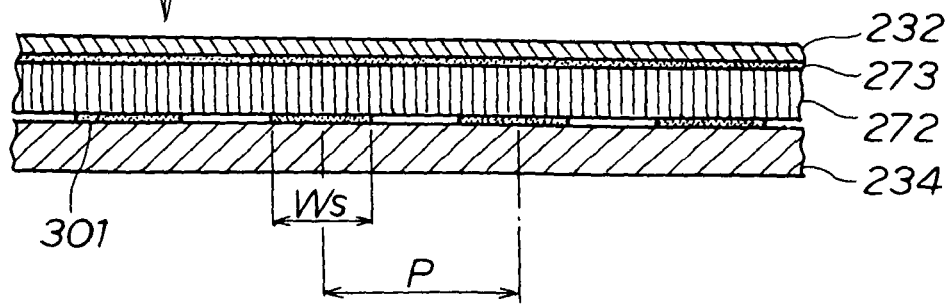
FIG. 17 is a cross-sectional view taken along line 17-17 of FIG. 14.

As shown in FIGS. 14 and 17, the weak adhesive layers 301 are formed by arranging an adhesive in substantially parallel columns at a pitch P and width Ws at the first and second side tear lines 264, 265 on both ends of the lid part 241. Since the surface area in which the adhesive is applied is reduced in comparison to that of the other adhesion region (skin member adhesive layer 271), the adhesion force is small in comparison to the skin member adhesive layer 271. The lengths of the columns of adhesive in the weak adhesive layers 301 are between the line segments S1 and S2 that form the triangular regions.

An example of the method for manufacturing the airbag device 211 will next be described. The airbag device 211 is first fitted into the opening 235 formed in the base member 234, while the base member 234 is supported in a fixture.

The skin member adhesive layer 271 is then formed by applying adhesive to the entire surface of the base member 234 except for the adhesion-adjusted parts 245.

An application tool to which an adhesive is applied is then placed in the triangular regions of the base member 234 in which the adhesion-adjusted parts 245 are formed, and aligned weak adhesive layers 301 are formed by removing the application tool.

The middle member 272 is applied to the base member 234 to which adhesive has been applied. At this time, the edges 279, 279 of the middle member 272 are separated to form a groove so that the stitch-accommodating space 274 is formed in a position corresponding to the central tear line 258 of the base member 234.

Pre-stitched leather 232 is then applied to the middle member 272. Specifically, the adhesive is applied to the entire surface of the middle member 272, and the leather adhesive layer 273 is formed. The stitched part 275 is then positioned inside the stitch-accommodating space 274, and the leather 232 is applied to the middle member 272.

An operation of the airbag device 211 of the second embodiment will next be described based on FIGS. 14 through 18.

In the airbag device 211, when an impact occurs at the front surface of the vehicle, the inflator 237 is activated based on front-surface impact information.

Deployment of the airbag 238 is begun by the operation of the inflator 237. Deployment of the airbag 238 causes the central tear line 258 to break, and tearing progresses to both ends (the third endpoints 297, 297 in FIG. 14) of the central tear line 258. At substantially the same time, the threads 286 of the stitched part 275 that are positioned at the skin opening 291 also break, and the skin opening 291 begins to open.

When tearing has progressed to both ends of the central tear line 258, the central tear line 258 is separated by the force of the airbag 238 deploying, and the first and second side tear lines 264, 265 begin to break.

Figure 18:
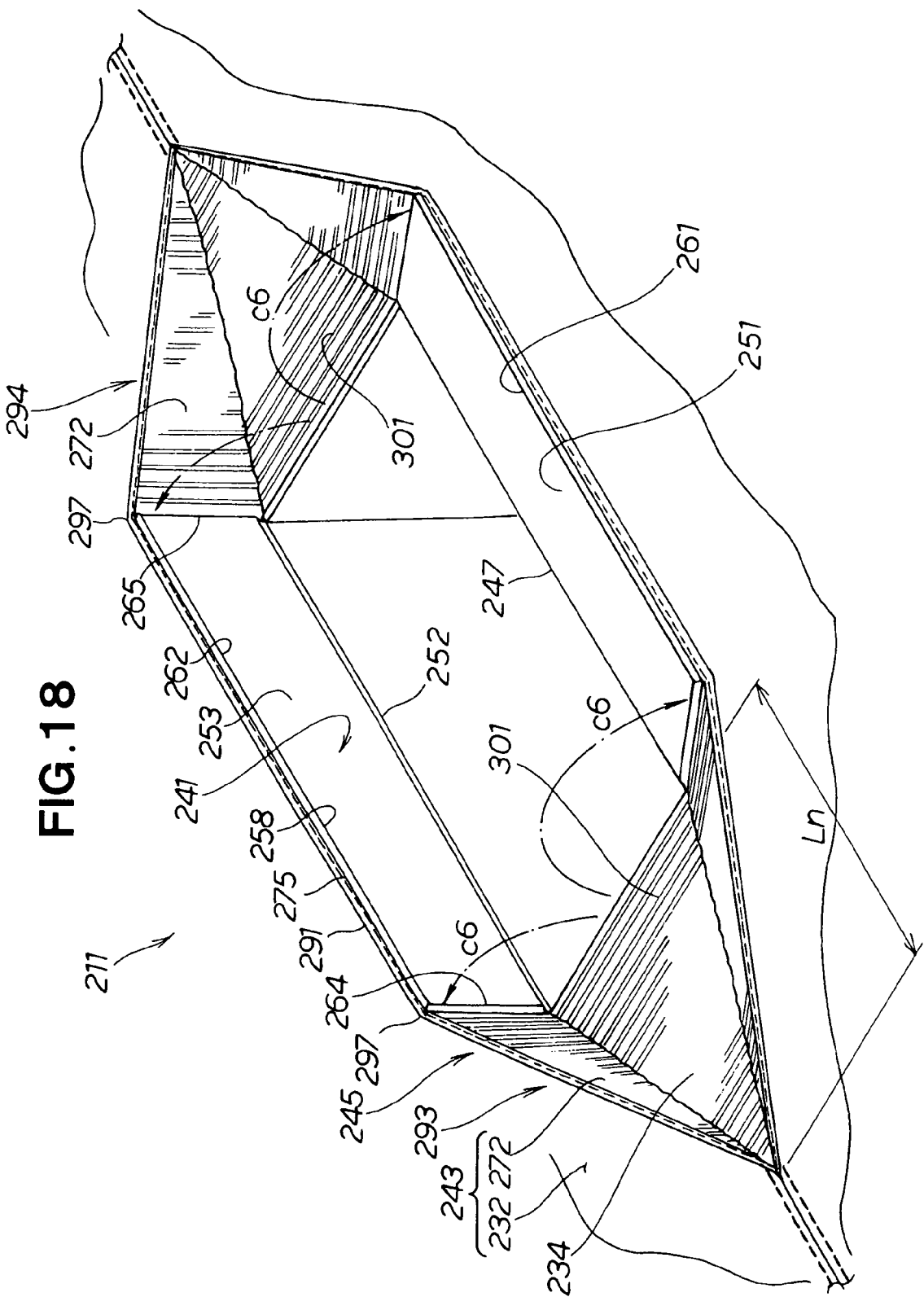
FIG. 18 is a view showing the airbag device according to the second embodiment of FIG. 14, in an open state.

At this time, since the skin member 243 begins to detach from the base member 234 in the adhesion-adjusted parts 245, and the threads of the stitched part 275 break in the first and second skin detaching parts 293, 294, the first and second skin detaching parts 293, 294 begin to open as indicated by the arrow c6 (FIG. 18).

In the adhesion-adjusted parts 245, since the adhesive is arranged in lines having a predetermined pitch P and width Ws, the adhesion force is small, and the resistance to detachment/opening of the skin member 243 is reduced. Consequently, adverse effects on the deploying properties of the airbag 238 can be reduced.

Then, while the first and second side tear lines 264, 265 are broken by the deploying force of the airbag 238, the first and second flaps 251, 253 pivot as indicated by the arrow c6 about the supporting axes of the first and second hinges 247, 252, respectively.

At this time, detachment of the skin member 243 continues in the adhesion-adjusted parts 245 as described above, but the adhesion is low in the adhesion-adjusted parts 245, and the skin member 243 detaches easily. The airbag 238 therefore deploys smoothly.

FIG. 19 shows the airbag device 211B according to a modification of the airbag device 211 of the second embodiment.

In the adhesion-adjusted parts 245B of the modification, weak adhesive layers 301B are formed in the triangular regions, and the adhesive is arranged in numerous points at a pitch P1.

Even though the adhesive in the weak adhesive layers 301B is arranged in points, the same operation and effects are obtained as in the airbag device 211 of the second embodiment. In other words, the deployment direction of the airbag 238 shown in FIG. 15 can be restricted.

Furthermore, a configuration may be adopted in which patterned irregular parts are formed on the surface of the base member 234 in the triangular regions, and the patterned irregular parts may be used as adhesion-adjusted parts for application thereon via an adhesive layer, the same as in the second modification of the first embodiment. The length of the patterned irregular parts may also be divided to give a predetermined pitch.

The airbag device of the present invention was adapted in the embodiments to leather used on an instrument panel, but the present invention may also be used in a location other than the instrument panel that is covered by leather.

An example was described in which the adhesive of the adhesion-adjusted parts is arranged in substantially parallel lines with respect to both ends of the lid part, but the adhesive may also be arranged at a 90° angle so as to be substantially parallel to the longitudinal axis of the lid part, or the adhesive may be arranged at a 45° angle.

Obviously, various minor changes and modifications of the present invention are possible in light of the above teaching. It is therefore to be understood that within the scope of the appended claims the invention may be practiced otherwise than as specifically described.

What is claimed is:

1. A vehicle airbag device comprising:
   a base member having an airbag deployment opening and first and second flaps each being capable of opening the opening by pivoting about respective hinge shafts provided at opposing edges of the opening;
   a skin member layered on the base member;
   a tear seam for breaking in correspondence with the flaps by deployment of an airbag, the tear seam being formed in the skin member in the direction of axis lines of the hinge shafts and including a main portion extending across the opening and first and second extended portions extending to regions outside the opening; and
   detaching parts formed in the skin member along the first and second extended portions of the tear seam so as to be detached from the base member by the flaps,
   wherein the tear seam is disposed closer to the axis line of one hinge shaft of the pair of hinge shafts than the other hinge shaft, and
   wherein the first flap is formed as an outward-curving door in which a width from both ends of a free end of the first flap to the hinge shaft is minimized, and the second flap is formed as an inward-curving door having a shape in which a free end of the second flap matches the free end of the first flap.

2. The airbag device of claim 1, wherein the flaps are demarcated by a weakened part that is broken by deployment of the airbag, the weakened part being formed in the base member, and the tear seam is provided along the weakened part.

3. The airbag device of claim 1, wherein a second hinge shaft of the respective hinge shafts is provided in a lower position than a first hinge shaft of the respective hinge shafts, and the opening is provided at an angle.

4. The airbag device of claim 1, wherein the detaching parts includes an adhesion-adjusted part that is adjusted so that an adhesion between the base member and the skin member is reduced.

5. The airbag device of claim 4, wherein the adhesion-adjusted part is adjusted so that a surface area in which an adhesive is applied between the base member and the skin member is smaller than a surface area on which an adhesive is applied in an area outside of the regions corresponding to the detaching parts.

6. The airbag device of claim 4, wherein the adhesion-adjusted part is adjusted by forming a patterned indented part in the base member so that a surface area of contact between the base member and the skin member is smaller than a surface area of contact of an area outside of the regions corresponding to the detaching parts.

7. A method for manufacturing a vehicle airbag device, comprising the steps of:
   obtaining a base member having an airbag deployment opening and flaps provided at the opening in such a manner as to be capable of opening;
   layering on the base member a skin member having a stitch-formed tear part for breaking together with the flaps by deployment of an airbag;
   forming a tear seam by arranging the tear part to essentially coincide with free ends of the flaps and to extend to continue to a region outside the flaps;

bonding the skin member to the base member in a state in which an adhesion-adjusted part in which the adhesion is reduced to correspond to the tear seam is provided outside the opening;

placing together and positioning a holder formed in the skin member so as to accommodate the tear part, and a protrusion formed in the base member so as to engage with the holder.

8. The manufacturing method of claim 7, further comprising the step of forming a weakened part on a back surface of the base member on which the protrusion is formed, the weakened part being formed along the protrusion.

9. The manufacturing method of claim 7, wherein the skin member comprises a surface member to which the tear part is provided, and a middle member layered with the surface member and provided with the holder in which the tear part is accommodated, and the method further comprises the step of placing the tear part of the surface member inside the holder.

10. A vehicle airbag device comprising:
a base member having an airbag deployment opening and at least one flap being capable of opening the opening by pivoting about a hinge shaft provided at an edge of the opening;
a skin member layered on the base member;
a tear seam for breaking in correspondence with the flap by deployment of an airbag, the tear seam being formed in the skin member in the direction of an axis line of the hinge shaft and including a main portion extending across the opening and first and second extended portions extending to regions outside the opening; and
detaching parts formed in the skin member along the first and second extended portions of the tear seam so as to be detached from the base member by the flap,
wherein the detaching parts each include an adhesion-adjusted part that is adjusted so that an adhesion between the base member and the skin member is reduced, and
wherein the adhesion-adjusted part is adjusted by forming a patterned indented part in the base member so that a surface area of contact between the base member and the skin member is smaller than a surface area of contact of an area outside of the regions corresponding to the detaching parts.

11. The airbag device of claim 10, wherein the at least one flap comprises a first and second flap having respective hinge shafts disposed along opposing edges of the opening, wherein the tear seam is disposed closer to the axis line of the hinge shaft of first flap than to the hinge shaft of the second flap.

12. The airbag device of claim 11, wherein the first flap is formed as an outward-curving door in which a width from both ends of a free end of the first flap to the hinge shaft is minimized, and the second flap is formed as an inward-curving door having a shape in which a free end of the second flap matches the free end of the first flap.

13. The airbag device of claim 11, wherein the hinge shaft of the the second flap is provided in a lower position than the hinge shaft of the first flap, and the opening is provided at an angle.

14. The airbag device of claim 10, wherein the at least one flap is demarcated by a weakened part that is broken by deployment of the airbag, the weakened part being formed in the base member, and the tear seam is provided along the weakened part.

15. The airbag device of claim 10, wherein the adhesion-adjusted part is adjusted so that a surface area in which an adhesive is applied between the base member and the skin member is smaller than a surface area on which an adhesive is applied in the other outside region.

* * * * *